US012777134B2

(12) United States Patent
Wu et al.

(10) Patent No.: US 12,777,134 B2
(45) Date of Patent: Oct. 27, 2026

(54) SYSTEM, METHOD AND NON-TRANSITORY COMPUTER READABLE STORAGE MEDIUM FOR ADJUSTING PROJECTION MODE

(71) Applicant: Coretronic Corporation, Hsin-Chu (TW)

(72) Inventors: Chun-Hsien Wu, Hsin-Chu (TW); Ssu-Ming Chen, Hsin-Chu (TW); Chih-Hao Wu, Hsin-Chu (TW); Jung-Chi Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/310,966

(22) Filed: Aug. 27, 2025

(65) Prior Publication Data

US 2026/0067434 A1 Mar. 5, 2026

(30) Foreign Application Priority Data

Sep. 5, 2024 (CN) ........................ 202411238834.6

(51) Int. Cl.
*H04N 9/31* (2006.01)

(52) U.S. Cl.
CPC ................................ *H04N 9/3182* (2013.01)

(58) Field of Classification Search
CPC ...... H04N 9/3182; H04N 9/31; H04N 9/3179; H04N 9/3185
USPC ............ 348/744–747, 760, 806–808; 353/39
See application file for complete search history.

(56) References Cited

U.S. PATENT DOCUMENTS

2020/0169706 A1* 5/2020 Mori .................... H04N 9/3185
2024/0094968 A1* 3/2024 Horikawa ............ H04N 9/3182

FOREIGN PATENT DOCUMENTS

CN 107305312 10/2017
CN 115529445 12/2022
CN 121644775 A 3/2026

* cited by examiner

*Primary Examiner* — Sherrie Hsia
(74) *Attorney, Agent, or Firm* — JCIPRNET

(57) ABSTRACT

The disclosure proposes a system, method, and non-transitory computer readable storage medium for adjusting projection modes. The above-mentioned system includes a projector and an electronic device. The projector has a plurality of projection modes, and the electronic device is communicatively connected to the projector. In response to the electronic device generating an auto mode instruction according to an operation, an image capture module on the electronic device is enabled to capture an image of an environment where the projector is located. The image capture module determines a plurality of imaging parameters when capturing the image according to the environment. The electronic device generates a setting instruction according to the imaging parameters and transmits the setting instruction to the projector. The projector selects one of the plurality of projection modes according to the setting instruction and determines a projection parameter of the projector according to the selected projection mode.

16 Claims, 4 Drawing Sheets

SYSTEM, METHOD AND NON-TRANSITORY COMPUTER READABLE STORAGE MEDIUM FOR ADJUSTING PROJECTION MODE

CROSS-REFERENCE TO RELATED APPLICATION

This application claims the priority benefit of China application serial no. 202411238834.6, filed on Sep. 5, 2024. The entirety of the above-mentioned patent application is hereby incorporated by reference herein and made a part of this specification.

BACKGROUND

Technical Field

The disclosure relates to a system and method for adjusting projection modes, which may automatically switch the projection modes.

Description of Related Art

In the existing technology, projectors provide a plurality of display modes, such as cinema mode, game mode, presentation mode, etc., to adapt to different application scenarios. However, switching between these modes often needs to be completed through an on-screen display (OSD) menu. The OSD menu is a menu interface displayed on the screen that is used to control various settings of a projector. However, the operation process of the OSD menu is usually cumbersome, and the user experience is not good for users who are unfamiliar with the operation. When switching display modes, users may need to perform a plurality of key operations or even navigate through a complex menu structure. This not only increases the difficulty of use, but may also affect the smoothness of the projection process. Therefore, a more intuitive and easy-to-operate user interface is needed to simplify the mode switching process and improve the user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

An embodiment of the disclosure provides a system for adjusting projection modes, including a projector and an electronic device. The projector has a plurality of projection modes, and the projector is adapted to project a projection image according to one of the projection modes. The electronic device is communicatively connected to the projector. The electronic device includes a processor and an image capture module. The processor is coupled to the image capture module. In response to the electronic device generating an auto mode instruction according to an operation, the processor enables the image capture module to capture an image of an environment where the projector is located. The image capture module determines a plurality of imaging parameters when capturing the image according to the environment. The processor generates a setting instruction according to the imaging parameters and transmits the setting instruction to the projector. The projector selects one of the plurality of projection modes as a selected mode according to the setting instruction and determines a projection parameter of the projector according to the selected mode.

An embodiment of the disclosure further provides a method for adjusting projection modes, including: in response to an auto mode instruction generated according to an operation, enabling an image capture module, so that the image capture module captures an image of an environment where a projector is located; and generating a setting instruction according to a plurality of imaging parameters and transmitting the setting instruction to the projector, so that the projector selects one of a plurality of projection modes as a selected mode according to the setting instruction and determines at least one projection parameter of the projector according to the selected mode. The imaging parameters are determined by the image capture module when capturing the image according to the environment.

An embodiment of the disclosure further provides a non-transitory computer readable storage medium that stores an application program that may be executed by a processor. When executed by the processor, the application program is used to complete the above-mentioned method for adjusting the projection modes.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

In order to make the above-mentioned features and advantages of the disclosure clearer and easier to understand, the following embodiments are given and described in details with accompanying drawings as follows.

DESCRIPTION OF THE EMBODIMENTS

Figure 1:
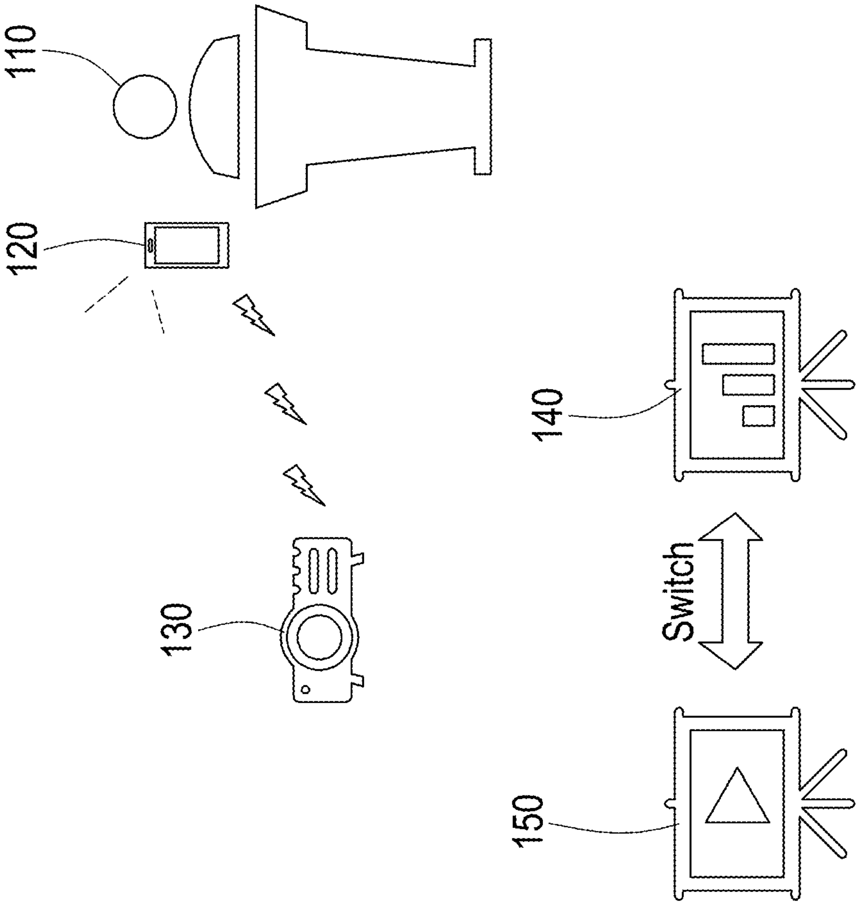
FIG. 1 is a schematic diagram showing an application scenario of a system for adjusting projection modes according to an embodiment.

Some of the embodiments of the disclosure will be described in detail below with reference to the accompanying drawings. Components labeled with the same reference numerals shown in different drawings will be regarded as the same or similar components. The embodiments are only a part of the disclosure and do not disclose all the possible implementations of the disclosure. More specifically, the embodiments are only examples of the system and the method in the claims of the disclosure.

In the following detailed description of the preferred embodiments, reference is made to the accompanying drawings which form a part hereof, and in which are shown by way of illustration specific embodiments in which the invention may be practiced. In this regard, directional terminology, such as “top,” “bottom,” “front,” “back,” etc., is used with reference to the orientation of the Figure(s) being described. The components of the disclosure can be positioned in a number of different orientations. As such, the directional terminology is used for purposes of illustration and is in no way limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The disclosure proposes a system, method, and non-transitory computer readable storage medium for adjusting projection modes that may automatically switch the projection modes of a projector.

Other objectives and advantages of the disclosure may be further understood from the technical features disclosed herein.

FIG. 1 is a schematic diagram showing an application scenario of a system for adjusting projection modes according to an embodiment. Referring to FIG. 1, a system for adjusting projection modes includes an electronic device 120 and a projector 130. The electronic device 120 is operated by a user 110, and the electronic device 120 is communicatively connected to the projector 130. The electronic device 120 may be a smartphone, a notebook computer, a tablet computer, a personal digital assistant, etc. The projector 130 has a plurality of projection modes, and is adapted to correspondingly project a projection image on a projection surface according to one of the plurality of projection modes. For example, the above-mentioned projection modes include a presentation mode 140, a cinema mode 150, and a bright mode. The user 110 may operate the electronic device 120 to activate an auto mode. In the auto mode, an image capture module of the electronic device 120 senses relevant information about the environment where the projector 130 is located, and then controls the projector 130 to switch the projection modes according to the relevant information, so as to achieve the purpose of automatically switching the projection modes. For example, when the electronic device 120 is in the auto mode and the user 110 is giving a presentation, the projector 130 is in the presentation mode 140. However, if the video is to be played during the presentation, the user 110 will temporarily turn off the light source of the environment. At this time, the electronic device 120 will detect the change in brightness in the environment, and then automatically control the projector 130 to switch the projection modes, so as to enter the cinema mode 150 suitable for the current environment. When the video ends and the presentation continues, the user 110 turns on the light source of the environment. At this time, the electronic device 120 will detect the change in brightness in the environment, and then automatically control the projector 130 to switch the projection modes, so as to return to the presentation mode 140 suitable for the current environment. In this way, the user 110 does not need to switch the projection modes of the projector 130 through the interface (such as the OSD menu) provided by the projector 130. The electronic device 120 may continuously sense changes in brightness in the environment and automatically switch the projector 130 to a projection mode suitable for the brightness of the current environment.

Figure 2:
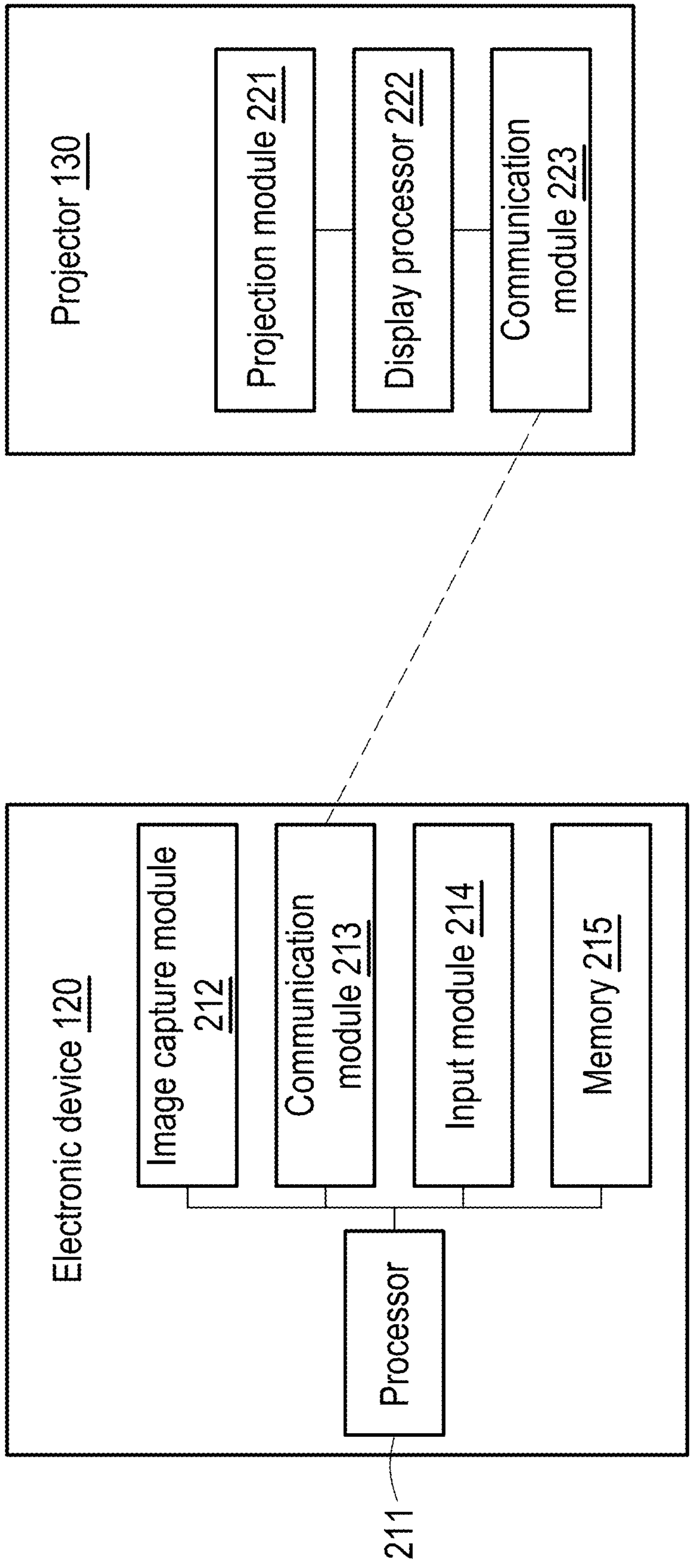
FIG. 2 is a system schematic diagram showing an electronic device and a projector according to an embodiment.

FIG. 2 is a system schematic diagram showing an electronic device and a projector according to an embodiment. Referring to FIG. 2, the electronic device 120 includes a processor 211, an image capture module 212, a communication module 213, an input module 214, and a memory 215. The processor 211 is coupled to the image capture module 212, the communication module 213, the input module 214, and the memory 215.

The processor 211 may be a central processing unit, a microprocessor, a microcontroller, an application specific integrated circuit (ASIC), a programmable logic device (PLD), etc. The image capture module 212 may include a lens, an aperture, a shutter, a light sensor, etc. The light sensor may be a charge-coupled device (CCD) sensor, a complementary metal-oxide semiconductor sensor or other suitable photosensitive elements. The communication module 213 may include a circuit that supports communication functions such as near field communication, infrared communication, Bluetooth, or wireless fidelity (Wi-Fi). The input module 214 may include a touch screen, a keyboard or a mouse, etc. The memory 215 may include a random access memory (RAM), a flash memory, a read-only memory, etc. An application program is stored in the memory 215, and the application program is executed by the processor 211.

On the other hand, the projector 130 includes a projection module 221, a display processor 222, and a communication module 223. The display processor 222 is coupled to the projection module 221 and the communication module 223. The projection module 221 is used to project the projection image on the projection surface. The projection module 221 may include a digital micromirror device (DMD), a liquid crystal display (LCD), a liquid crystal on silicon (LCoS) panel, a digital light processing (DLP) unit, a light source, a zoom lens, a zoom motor, or other display-related elements. The display processor 222 is, for example, a microprocessor, a display chip, a microcontroller, an application specific integrated circuit, a programmable logic device, etc. The communication module 223 may include a circuit that supports communication functions such as near field communication, infrared communication, Bluetooth, or wireless fidelity (Wi-Fi) for being communicatively connected to the communication module 213 of the electronic device 120.

Figure 3:
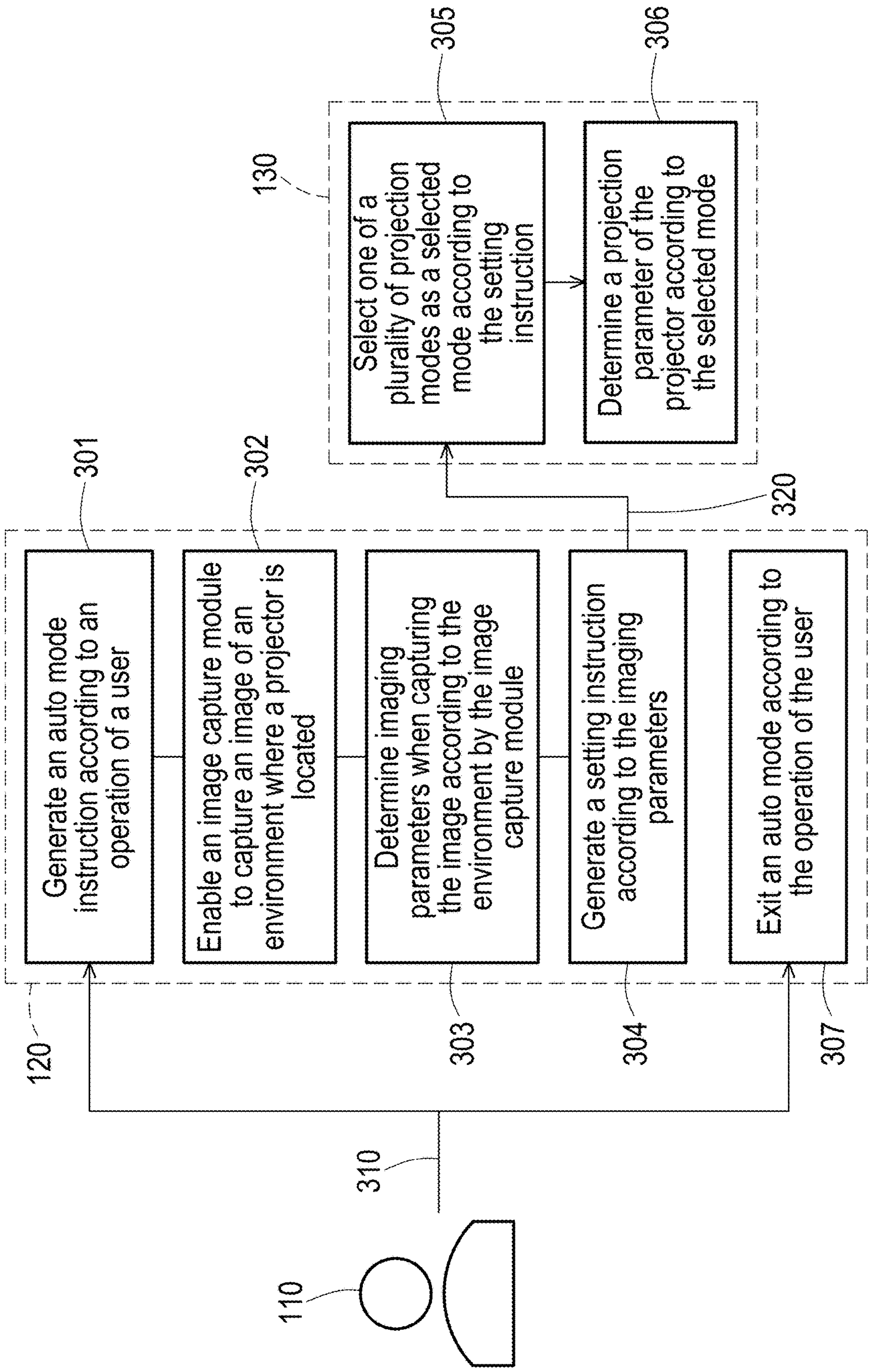
FIG. 3 is an operational flowchart showing a system for adjusting projection modes according to an embodiment.

FIG. 3 is an operational flowchart showing a system for adjusting projection modes according to an embodiment. Referring to FIG. 1 to FIG. 3, first, the user 110 performs an operation 310 on the electronic device 120, causing the electronic device 120 to perform step 301: generating an auto mode instruction according to the operation of the user 110. In some embodiments, the processor 211 executes an application program in the memory 215. The application program provides an interface. The interface may include one or more graphical objects, such as buttons, menus, sliders, etc. The user 110 may perform the operation 310 on the interface, such as pressing a button corresponding to the auto mode function, and then the application program causes the processor 211 to generate the auto mode instruction according to the operation 310.

In response to the auto mode instruction generated by the electronic device 120 according to operation 310, in step 302, the processor 211 enables the image capture module 212 to capture an image of the environment where the projector 130 is located. In an embodiment, the image capture module 212 continues to capture the image of the environment, and the user 110 does not need to press the shutter button. In some embodiments, the user 110 may point the image capture module 212 toward a light source in the environment, or toward the ceiling, etc., so that the image capture module 212 may sense the light intensity in the environment.

In step 303, the image capture module 212 determines a plurality of imaging parameters when capturing the image according to the environment where the projector 130 is located. The imaging parameters include, for example, an exposure time, an aperture size, and a sensitivity (ISO). The exposure time refers to the length of time between the opening and closing of the shutter of the image capture module 212. During this period, light is projected onto the photosensitive element through the lens of the image capture module 212. The length of exposure time directly affects the amount of light, which in turn affects the brightness and color saturation of the image and the effect of dynamic capture. The size of the aperture determines the amount of light entering the lens of the image capture module 212. The larger the aperture (the smaller the value), the more light enters and the more obvious the effect of background blur (shallow depth of field); the smaller the aperture (the larger the value), the less light enters and the deeper the depth of field. In addition, the higher the sensitivity, the greater the corresponding noise in the image, which may affect the purity of the color. The image capture module 212 itself has its own mechanism to determine the imaging parameters such as the exposure time, the aperture size, and the sensitivity. For example, when the environment is dark, the exposure time may be increased, the aperture size may be increased (decrease the value), and the sensitivity may be increased. These imaging parameters may reflect the brightness of the environment and other conditions. In the embodiment, the ambient brightness is not determined by the pixels in the image. This is because the pixels in the image also reflect the color of the objects in the environment. If the object is black, the grayscale value of the pixel will also be low, so the pixel does not accurately reflect the ambient brightness. On the contrary, the above imaging parameters have nothing to do with the color of the objects in the environment and may effectively reflect the environmental conditions. In addition, the specifications of the image capture modules 212 in different electronic devices 120 are also different. The image capture modules may also apply different image correction or color adjustment algorithms to process the pixels. If the pixels in the image are used to analyze the light intensity, it may not be able to represent the brightness of the actual environment. In the embodiment, the imaging parameters are used to calculate the ambient brightness, which may avoid errors caused by using different electronic devices and obtain ambient brightness that is more consistent with actual conditions.

In step 304, the processor 211 generates a setting instruction according to the imaging parameters. The setting instruction is used to select the projection mode of the projector 130. As mentioned above, the imaging parameters may reflect the brightness of the environment, so the processor 211 may determine an appropriate projection mode based on the imaging parameters. In some embodiments, the processor 211 calculates the light intensity corresponding to the environment according to the imaging parameters, and generates the setting instruction according to the light intensity. For example, when the ambient light intensity is low, a cinema mode may be selected, and when the ambient light intensity is high, a bright mode or a presentation mode may be selected.

In some embodiments, the processor 211 calculates an exposure value EV according to the imaging parameters and the following Mathematical Formula 1, and then uses the exposure value EV to calculate a light intensity Lux corresponding to the environment through the following Mathematical Formula 2.

$$EV = \log_2\left(\frac{A^2}{t\cdot\left(\frac{ISO}{100}\right)}\right) \quad \text{[Mathematical Formula 1]}$$

$$Lux = \alpha \times 2^{EV} \quad \text{[Mathematical Formula 2]}$$

Wherein, EV is the exposure value, A is the aperture size, t is the exposure time, ISO is the sensitivity, and Lux is the ambient light intensity. $\alpha$ is a real number, for example, $\alpha$ is 2.5.

In the embodiment, the projector 130 has three projection modes, namely a first mode, a second mode, and a third mode, and the three modes are adapted for different scenarios. The first mode may be called a cinema mode, the second mode may be called a presentation mode, and the third mode may be called a bright mode, but the disclosure does not limit the names of these modes. For example, in some embodiments, the cinema mode may also be called the theater mode. In some embodiments, when the above-mentioned light intensity Lux is less than a first intensity threshold, the processor 211 generates the setting instruction corresponding to the first mode. When the light intensity Lux is greater than or equal to the first intensity threshold and less than a second intensity threshold, the processor 211 generates the setting instruction corresponding to the second mode. When the light intensity Lux is greater than or equal to the second intensity threshold, the processor 211 generates the setting instruction corresponding to the third mode. The second intensity threshold is greater than the first intensity threshold. In other embodiments, the projector 130 may also have more or fewer projection modes, and the disclosure does not limit the number and names of the projection modes.

Next, the processor 211 will transmit a setting instruction 320 to the projector 130. In step 305, the projector 130 selects one of the plurality of projection modes as a selected mode according to the setting instruction 320. In step 306, the display processor 222 determines a projection parameter of the projector 130 according to the selected mode. The projection parameter includes, for example, the brightness, contrast, color temperature, etc., of the projection image. For example, when the processor 211 generates the setting instruction 320 corresponding to the first mode to the projector 130, the projector 130 will use the first mode in the projector 130 as the selected mode according to the setting instruction 320, and the display processor 222 will project the projection image according to the projection parameter set in the projector 130 corresponding to the first mode. In different projection modes, the brightness of the projection image is different. For example, the brightness in the first mode is smaller than the brightness in the second mode, and the brightness in the second mode is smaller than the brightness in the third mode. In some embodiments, the contrast of the projection image is also different in different projection modes, and the display processor 222 may determine the contrast of each projection mode according to preset parameters.

In some embodiments, fine-tuning may also be performed in each projection mode. For example, the user 110 may select brighter or darker, increase or decrease the contrast, adjust color temperature and other operations on the interface provided by the electronic device 120. The processor 211 may generate a fine-tuning instruction according to the operation of the user 110 and transmit the fine-tuning instruction to the projector 130. The display processor 222 of the projector 130 will adjust the projection parameter of the projection image according to the received fine-tuning instruction, such as adjusting the brightness, contrast, or color temperature.

In some embodiments, in addition to determining the projection modes based on the light intensity Lux, the processor 211 may also generate the fine-tuning instruction based on the light intensity. For example, the processor 211 may also divide the light intensity into more detailed categories. More sub-ranges may be set within these three ranges of less than the first intensity threshold, between the first intensity threshold and the second intensity threshold, and greater than or equal to the second intensity threshold. In different sub-ranges, corresponding fine-tuning instructions may be generated. For example, in the first mode, if the light intensity is greater than the third intensity threshold, a fine-tuning instruction is generated to increase the projection brightness. Otherwise, a fine-tuning instruction is generated to reduce the projection brightness, wherein the third intensity threshold is smaller than the first intensity threshold.

In the embodiment of FIG. 3, after the electronic device 120 generates the auto mode instruction in step 301, the processor 211 will enter the auto mode and determine whether to exit the auto mode every preset period of time. In some embodiments, the user 110 may perform the operation 310 related to disabling the auto mode on the electronic device 120. The operation 310 may include pressing a button to disable the auto mode on the electronic device 120, or selecting a button corresponding to one of the plurality of projection modes of the projector 130. In response to the above operation 310, the electronic device 120 performs step 307: the processor 211 exits the auto mode according to the operation of the user. If the user does not perform the operation 310 to exit the auto mode, the processor 211 will remain in the auto mode.

In some embodiments, the user 110 may also select a projection mode in the OSD menu provided by the projector 130, and then the projector 130 will transmit a termination instruction to the electronic device 120 to cause the electronic device 120 to exit the auto mode.

If it is determined that the auto mode is maintained, the processor 211 will repeat steps 302 to 304, that is, continue to obtain the imaging parameters of the image capture module 212, so as to generate the setting instruction 320 and transmit the setting instruction 320 to the projector 130. If it is determined to exit the auto mode, the processor 211 disables the image capture module 212 to stop capturing the image of the environment.

Figure 4:
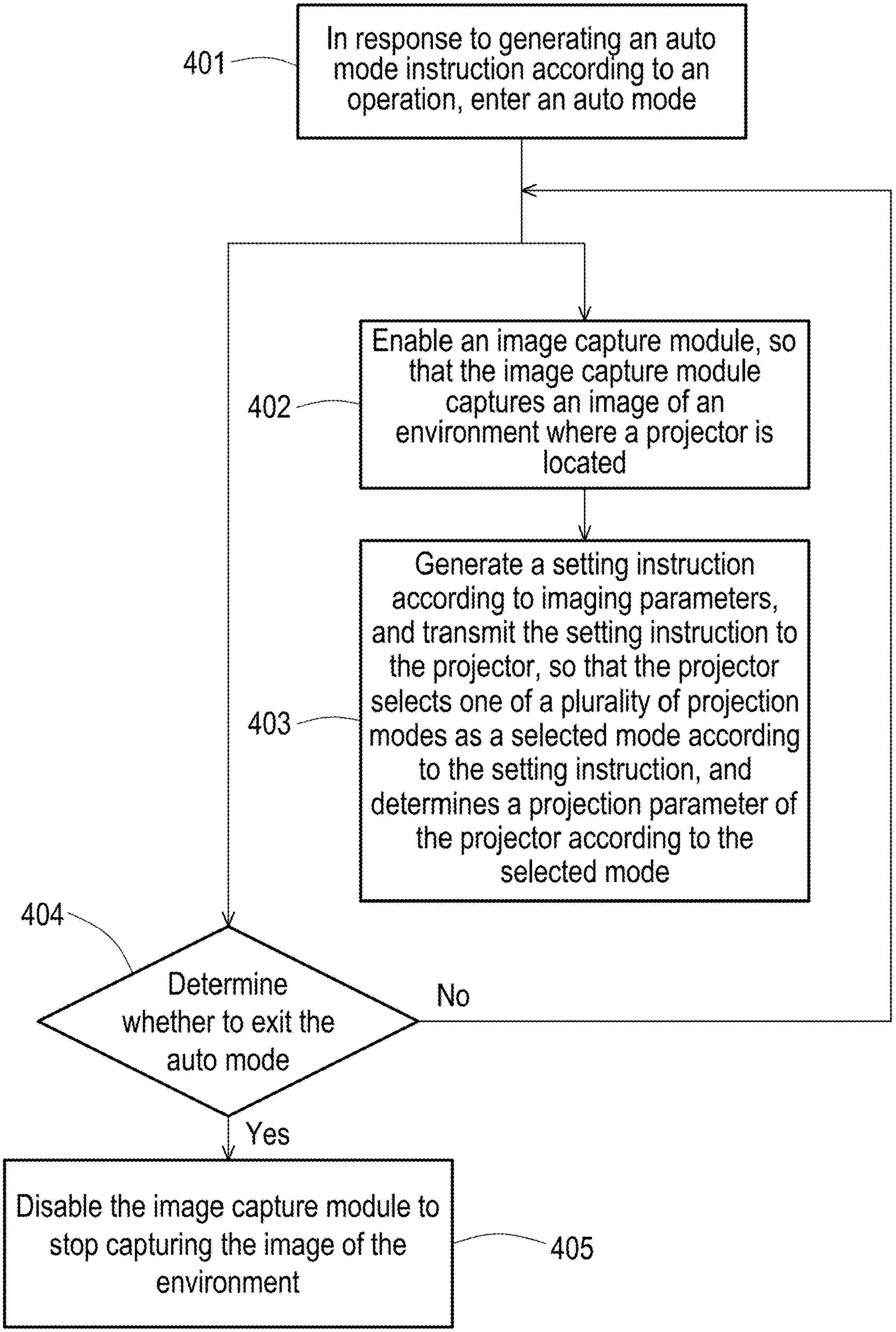
FIG. 4 is a flowchart showing a method for adjusting projection modes according to an embodiment.

FIG. 4 is a flowchart showing a method for adjusting projection modes according to an embodiment. Referring to FIG. 4, in step 401, in response to generating the auto mode instruction according to the operation, the auto mode is entered. In step 402, the image capture module is enabled, so that the image capture module captures the image of the environment where the projector is located. In step 403, the setting instruction is generated according to the imaging parameters, and the setting instruction is transmitted to the projector, so that the projector selects one of the plurality of projection modes as the selected mode according to the setting instruction, and determines the projection parameter of the projector according to the selected mode. The imaging parameters are determined by the image capture module when capturing the image according to the environment. On the other hand, step 404 is performed every preset period of time to determine whether to exit the auto mode. If the determination result of step 404 is no (maintain in the auto mode), then the process returns to step 402 and performs step 404 again after a preset time. If the determination result of step 404 is yes, step 405 is performed to disable the image capture module to stop capturing the image of the environment. Each step in FIG. 4 has been described in detail above and will not be repeated here. It is worth noting that each step in FIG. 4 may be implemented as a plurality of program codes or circuits, and the disclosure is not limited thereto. In addition, the method in FIG. 4 may be used in conjunction with the above embodiments or may be used alone. In other words, other steps may also be added between the steps in FIG. 4.

The disclosure also proposes a non-transitory computer readable storage medium, such as random access memory, a read-only memory, a flash memory, a floppy disk, a hard disk, an optical disk, a pen drive, a magnetic tape, etc. The non-transitory computer readable storage medium stores an application program that may be executed by the processor. When executed by the processor, the application program is used to complete the above-mentioned method for adjusting the projection modes.

To sum up, the system and method for adjusting the projection modes of the embodiments of the disclosure have at least one of the following advantages. First of all, in the auto mode, the user does not need to manually change the projection modes of the projector, but the electronic device automatically senses the ambient brightness. When the ambient brightness changes, the projection modes of the projector may be automatically switched. Furthermore, using imaging parameters to calculate the light intensity of the environment instead of using image pixels may avoid being affected by different algorithms on different electronic devices and avoid being affected by the color of objects in the environment.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A system for adjusting projection modes, comprising a projector and an electronic device, wherein:

the projector has a plurality of projection modes, the projector is adapted to correspondingly project a projection image according to one of the plurality of projection modes;

the electronic device is communicatively connected to the projector, the electronic device comprises a processor and an image capture module, the processor is coupled to the image capture module, in response to the electronic device generating an auto mode instruction according to an operation, the processor enables the image capture module to capture an image of an environment where the projector is located, the image capture module determines a plurality of imaging parameters when capturing the image according to the environment, the processor generates a setting instruction according to the plurality of imaging parameters and transmits the setting instruction to the projector, the projector selects one of the plurality of projection modes as a selected mode according to the setting instruction and determines at least one projection parameter of the projector according to the selected mode.

2. The system for adjusting the projection modes according to claim 1, wherein the plurality of imaging parameters comprise an exposure time, an aperture size, and a sensitivity, the processor calculates a light intensity corresponding to the environment according to the plurality of imaging parameters and generates the setting instruction according to the light intensity.

3. The system for adjusting the projection modes according to claim 2, wherein the light intensity of the environment is calculated according to the following Mathematical Formula 1 and Mathematical Formula 2:

$$EV = \log_2\left(\frac{A^2}{t \cdot \left(\frac{ISO}{100}\right)}\right) \quad \text{[Mathematical Formula 1]}$$

$$Lux = \alpha \times 2^{EV} \quad \text{[Mathematical Formula 2]}$$

EV is an exposure value, A is the aperture size, t is the exposure time, ISO is the sensitivity, Lux is the light intensity of the environment, and α is a real number.

4. The system for adjusting the projection modes according to claim 3, wherein the plurality of projection modes comprise a first mode, a second mode, and a third mode, wherein when the light intensity is less than a first intensity threshold, the processor generates the setting instruction corresponding to the first mode, when the light intensity is greater than or equal to the first intensity threshold and less than a second intensity threshold, the processor generates the setting instruction corresponding to the second mode, when the light intensity is greater than or equal to the second intensity threshold, the processor generates the setting instruction corresponding to the third mode, the second intensity threshold is greater than the first intensity threshold.

5. The system for adjusting the projection modes according to claim 4, wherein the at least one projection parameter comprises a brightness of the projection image, the brightness in the first mode is less than the brightness in the second mode, and the brightness in the second mode is less than the brightness in the third mode.

6. The system for adjusting the projection modes according to claim 4, wherein the processor is further configured to generate a fine-tuning instruction according to the light intensity and transmit the fine-tuning instruction to the projector, the projector is configured to adjust the at least one projection parameter according to the fine-tuning instruction, and the at least one projection parameter comprises at least one of brightness and contrast of the projection image.

7. The system for adjusting the projection modes according to claim 1, wherein after the electronic device generates the auto mode instruction, the processor enters an auto mode and determines whether to exit the auto mode every preset time, if it is determined that the auto mode is maintained, the processor continues to obtain the imaging parameters of the image capture module to generate the setting instruction and transmits the setting instruction to the projector, if it is determined to exit the auto mode, the processor disables the image capture module to stop capturing the image of the environment.

8. The system for adjusting the projection modes according to claim 1, wherein the electronic device comprises an application program, and when the processor executes the application program, the application program causes the processor to generate the auto mode instruction according to the operation.

9. A method for adjusting projection modes, comprising:

in response to generating an auto mode instruction according to an operation, enabling an image capture module, so that the image capture module captures an image of an environment where a projector is located; and generating a setting instruction according to a plurality of imaging parameters and transmitting the setting instruction to the projector, so that the projector selects one of a plurality of projection modes as a selected one according to the setting instruction and determines at least one projection parameter of the projector according to the selected mode, wherein the plurality of imaging parameters are determined by the image capture module when capturing the image according to the environment.

10. The method for adjusting the projection modes according to claim 9, wherein the plurality of imaging parameters comprise an exposure time, an aperture size, and a sensitivity, and the step of generating the setting instruction according to the plurality of imaging parameters comprises:

calculating a light intensity corresponding to the environment according to the plurality of imaging parameters and generating the setting instruction according to the light intensity.

11. The method for adjusting the projection modes according to claim 10, wherein the light intensity of the environment is calculated according to the following Mathematical Formula 1 and Mathematical Formula 2:

$$EV = \log_2\left(\frac{A^2}{t\cdot\left(\frac{ISO}{100}\right)}\right) \quad \text{[Mathematical Formula 1]}$$

$$Lux = \alpha \times 2^{EV} \quad \text{[Mathematical Formula 2]}$$

EV is an exposure value, A is the aperture size, t is the exposure time, ISO is the sensitivity, Lux is the light intensity of the environment, and α is a real number.

12. The method for adjusting the projection modes according to claim 11, wherein the plurality of projection modes comprise a first mode, a second mode, and a third mode, and the step of generating the setting instruction according to the light intensity comprises:

when the light intensity is less than a first intensity threshold, generating the setting instruction corresponding to the first mode;

when the light intensity is greater than or equal to the first intensity threshold and less than a second intensity threshold, generating the setting instruction corresponding to the second mode; and when the light intensity is greater than or equal to the second intensity threshold, generating the setting instruction corresponding to the third mode, the second intensity threshold is greater than the first intensity threshold.

13. The method for adjusting the projection modes according to claim 12, wherein the projector is adapted to correspondingly project a projection image according to one of the plurality of projection modes, the at least one projection parameter comprises a brightness of the projection image, the brightness in the first mode is less than the brightness in the second mode, and the brightness in the second mode is less than the brightness in the third mode.

14. The method for adjusting the projection modes according to claim 12, wherein the projector is adapted to correspondingly project a projection image according to one of the plurality of projection modes, and the method for adjusting the projection modes further comprises:

generating a fine-tuning instruction according to the light intensity and transmitting the fine-tuning instruction to the projector, so that the projector adjusts the at least one projection parameter according to the fine-tuning instruction, wherein the at least one projection parameter comprises at least one of brightness and contrast of the projection image.

15. The method for adjusting the projection modes according to claim 9, further comprising:

after the auto mode instruction is generated, entering an auto mode and determining whether to exit the auto mode every preset time;

if it is determined that the auto mode is maintained, continuing to obtain the plurality of imaging parameters of the image capture module to generate the setting instruction and transmit the setting instruction to the projector; and if it is determined to exit the auto mode, disabling the image capture module to stop capturing the image of the environment.

16. A non-transitory computer readable storage medium that stores an application program that can be executed by a processor, wherein when executed by the processor, the application program is configured to complete the method for adjusting the projection modes according to claim 9.

* * * * *